US010387524B2

(12) United States Patent
O'Connell, Jr. et al.

(10) Patent No.: US 10,387,524 B2
(45) Date of Patent: Aug. 20, 2019

(54) SYSTEM AND METHOD FOR MANAGING OBJECTS USING AN OBJECT MAP

(75) Inventors: Conleth S. O'Connell, Jr., Austin, TX (US); Marceu Martins de Souza Filho, Toronto (CA); Lee Shepstone, Oxford (GB)

(73) Assignee: Open Text SA ULC, Halifax (CA)

( * ) Notice: Subject to any disclaimer, the term of this patent is extended or adjusted under 35 U.S.C. 154(b) by 1227 days.

(21) Appl. No.: 13/248,738

(22) Filed: Sep. 29, 2011

(65) Prior Publication Data

US 2014/0189557 A1 Jul. 3, 2014

Related U.S. Application Data

(60) Provisional application No. 61/387,884, filed on Sep. 29, 2010.

(51) Int. Cl.
*G06F 16/958* (2019.01)

(52) U.S. Cl.
CPC .. *G06F 16/958* (2019.01); *G06F 2203/04805* (2013.01)

(58) Field of Classification Search
CPC .................. G06F 2203/04805; G06F 17/3089
USPC ........................................ 715/767, 764, 784
See application file for complete search history.

(56) References Cited

U.S. PATENT DOCUMENTS 5,930,797 A * 7/1999 Hill ..................... G11B 27/034
6,144,962 A * 11/2000 Weinberg ............... G06F 11/32
6,163,749 A * 12/2000 McDonough ........ G01C 21/367 340/995.14
6,611,840 B1 * 8/2003 Baer ..................... G06F 16/958 715/270
6,745,196 B1 * 6/2004 Colyer ................... G06Q 10/10 707/608
7,165,041 B1 * 1/2007 Guheen .................. G06Q 30/04 705/26.1
7,747,625 B2 * 6/2010 Gargi ...................... G06F 16/58 707/737
7,791,466 B2 * 9/2010 Agarwalla ....... G08B 13/19615 340/286.14
7,925,676 B2 * 4/2011 Hogue ............. G06F 17/30554 707/723
8,077,918 B2 * 12/2011 Kirmse ................ G06T 1/0085 382/103
2002/0052769 A1 * 5/2002 Navani .................. G06Q 10/06 719/316
2002/0083097 A1 * 6/2002 Warrington ........... G06F 16/958 715/229
2002/0089550 A1 * 7/2002 Orbanes ................ G06F 3/0346 715/853
2003/0028517 A1 * 2/2003 Nakano ................. G06F 16/958
2003/0038836 A1 * 2/2003 Ronald ................. G06F 16/954 715/738

(Continued)

*Primary Examiner* — Ryan F Pitaro
*Assistant Examiner* — Henry Orr
(74) *Attorney, Agent, or Firm* — Sprinkle IP Law Group

(57) ABSTRACT

Embodiments described herein provide systems and methods for mapping objects. One embodiment can include a server providing an object management system managing objects in a repository and an application program interface for interfacing with the object management system. The system can also include an object mapping system configured to provide an object map of the objects in the repository in a manner that allows a user to easily navigate and take actions on the objects.

18 Claims, 6 Drawing Sheets

(56) References Cited

U.S. PATENT DOCUMENTS

| | | | | |
|---|---|---|---|---|
| 2003/0079177 | A1* | 4/2003 | Brintzenhofe | G06F 17/211 715/205 |
| 2004/0254938 | A1* | 12/2004 | Marcjan | G06F 16/148 |
| 2005/0114356 | A1* | 5/2005 | Bhatti | G06F 16/16 |
| 2005/0267887 | A1* | 12/2005 | Robins | G06Q 10/06 |
| 2005/0283798 | A1* | 12/2005 | Hunleth | G06F 3/0481 725/37 |
| 2006/0229922 | A1* | 10/2006 | Levy | G06Q 10/063 705/7.11 |
| 2007/0028162 | A1* | 2/2007 | Griffin | G06F 16/958 715/235 |
| 2007/0136676 | A1* | 6/2007 | Kruempelmann | G06F 16/9038 715/764 |
| 2007/0171716 | A1* | 7/2007 | Wright | G06T 11/206 365/185.12 |
| 2007/0185895 | A1* | 8/2007 | Hogue | G06F 16/248 |
| 2008/0010605 | A1* | 1/2008 | Frank | G06F 16/38 715/765 |
| 2008/0109756 | A1* | 5/2008 | Stambaugh | G06F 16/9537 715/835 |
| 2008/0215588 | A1* | 9/2008 | Mattheisen | G06F 21/604 |
| 2008/0294663 | A1* | 11/2008 | Heinley | G06F 3/0481 |
| 2009/0006427 | A1* | 1/2009 | Veeraraghavan | G06Q 10/00 |
| 2009/0006953 | A1* | 1/2009 | Perantatos | G06F 16/958 715/700 |
| 2009/0106234 | A1* | 4/2009 | Siedlecki | G06Q 30/0276 |
| 2009/0281718 | A1* | 11/2009 | Gibran | G01C 21/32 701/532 |
| 2009/0300528 | A1* | 12/2009 | Stambaugh | G06F 3/04817 715/764 |
| 2011/0040760 | A1* | 2/2011 | Fleischman | G06Q 30/02 707/737 |
| 2011/0313649 | A1* | 12/2011 | Bales | G01C 21/20 701/455 |
| 2012/0094639 | A1* | 4/2012 | Carlson | H04W 4/029 455/414.1 |
| 2012/0124307 | A1* | 5/2012 | Ashutosh | G06F 11/1451 711/162 |
| 2012/0162265 | A1* | 6/2012 | Heinrich | G06Q 10/06393 345/661 |
| 2013/0110838 | A1* | 5/2013 | Lidy | G06F 16/285 707/737 |
| 2013/0318207 | A1* | 11/2013 | Dotter | H04L 29/08117 709/219 |
| 2014/0189557 | A1* | 7/2014 | O'Connell, Jr. | G06F 17/3089 715/767 |
| 2014/0310623 | A1* | 10/2014 | O'Connell, Jr. | G06F 17/3089 715/764 |

* cited by examiner

SYSTEM AND METHOD FOR MANAGING OBJECTS USING AN OBJECT MAP

RELATED APPLICATIONS

This application claims the benefit of priority under 35 U.S.C. § 119(e) to U.S. Provisional Patent Application 61/387,884, entitled "SYSTEM AND METHOD FOR MANAGING CONTENT USING A CONTENT MAP," filed Sep. 29, 2010, which are fully incorporated by reference herein.

BACKGROUND

Many companies have large websites that require management of 100,000s and even millions of objects (web pages, images, documents or other content items). Traditionally, these items have been managed using a file system view. Such a view, however, becomes cumbersome when there are a large amount of items and does not give access to important metadata used during the workflow of an object. Therefore, a new method of visualizing and managing objects is required.

SUMMARY

Example embodiments relate to systems, a computer program product with executable portions, and methodology for managing objects using an object map.

One embodiment includes a server providing an object management system managing objects in a repository and an application program interface for interfacing with the object management system along with an object mapping system coupled to the server over a network. The object mapping system can be configured to display an object map in a graphical user interface, the object map representing the objects in the repository and relationships between the objects, determine a region of interest in the object map presented in a graphical user interface representing objects in a repository, retrieve over a network through the application program interface metadata for a first set of objects in the repository based on the region of interest, display in the graphical user interface a view of the first set of objects, wherein the view comprises nodes representing the first set of objects in the repository and links representing relationships between the objects within the first set of objects, wherein the nodes are organized in the view based on the relationships, determine that the region of interest in the object map has changed to a new position based on user interaction with the graphical user interface, retrieve through the application program interface metadata for the second set of objects in the repository based on the new position of the region of interest and display in the graphical user interface a modified view, the modified view including nodes representing the second set of objects in the repository and links representing the relationships between the objects within the second set of objects as part of a continuous object map with the first set of nodes.

Another embodiment includes a non-transitory computer program product comprising at least one computer-readable storage medium having computer-readable program code portions stored therein. The computer readable program code can be executable to display an object map in a graphical user interface, the object map representing the objects in the repository and relationships between the objects, determine a region of interest in the object map presented in a graphical user interface representing objects in a repository, retrieve over a network through the application program interface metadata for a first set of objects in the repository based on the region of interest, display in the graphical user interface a view of the first set of objects, wherein the view comprises nodes representing the first set of objects in the repository and links representing relationships between the objects within the first set of objects, wherein the nodes are organized in the view based on the relationships, determine that the region of interest in the object map has changed to a new position based on user interaction with the graphical user interface, retrieve through the application program interface metadata for the second set of objects in the repository based on the new position of the region of interest and display in the graphical user interface a modified view, the modified view including nodes representing the second set of objects in the repository and links representing the relationships between the objects within the second set of objects as part of a continuous object map with the first set of nodes.

Another embodiment can include a method comprising displaying an object map based in a graphical user interface, the object map representing objects in a repository and relationships between the objects, determining a region of interest in the object map presented in a graphical user interface representing objects in a repository, retrieving over a network through an application program interface metadata for a first set of objects in the repository based on the region of interest, displaying in the graphical user interface a view of the first set of objects, wherein the view comprises nodes representing the first set of objects in the repository and links representing relationships between the objects within the first set of objects, wherein the nodes are organized in the view based on the relationships, determining that the region of interest in the object map has changed to a new position based on user interaction with the graphical user interface, retrieving through the application program interface metadata for the second set of objects in the repository based on the new position of the region of interest and displaying in the graphical user interface a modified view, the modified view including nodes representing the second set of objects in the repository and links representing the relationships between the objects within the second set of objects as part of a continuous object map with the first set of nodes.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments, and wherein.

DETAILED DESCRIPTION

Figure 1:
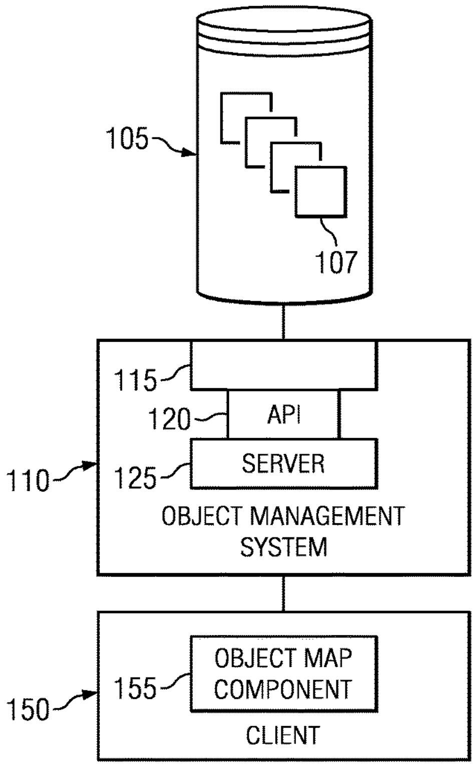
FIG. 1 illustrates an example embodiment of a system for managing objects.

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Embodiments described herein provide an intuitive system for viewing and managing objects and items. Objects can be an entire web page, a component of a web page, an insertion into a web page, a graphic link, templates, program fragments, documents, configuration files, reference (link, indirect representation) to the said items, any other workflow related item, user objects, group objects, objects may represent departments processes, assets or other objects defined in a system. In one embodiment, a web site can be managed as a set of objects corresponding to content items, channels and sites linked together to form a site structure.

FIG. 1 illustrates a system 100 for managing objects 107. The objects can be managed by an object management system 110. The object management system 110 includes object management software 115 and provides an API 120 through which objects 107 or information about the objects can be retrieved. A server component 125 can act to receive and process requests from clients.

Objects 107 may be stored in a repository 105. In some cases, rather than storing the objects 107, repository 105 can include references to another system and its corresponding objects or repository. For example, a bank statement may reside in an enterprise system, but object management system 110 can access it. Further, the repository 105 may store metadata for the corresponding objects 107. Each object can have an arbitrary amount of metadata associated with it. For purposes of managing a web site, such metadata may include workflow metadata such as whether the object has been approved for publication, whether it was published, or any other information that is useful in classifying the object for web site management. The workflow metadata may relate to a sequence of related projects, operations or work that may be performed by a person, a group of persons, an organization. Also, the workflow metadata that is stored in the repository 105 may include scheduling information such as a date and time corresponding to events, including future dates for an event. For example, the workflow metadata may indicate a time and date for events such as when an object 107 was or may be approved for publication, the object was or will be published, and so on. Objects, according to one embodiment, can be associated with a job object that has, as part of its metadata, due dates for events. In other embodiments, the metadata of each object can include the due dates for events.

An object mapping system 150 can include an object map program 155. According to one embodiment, object map program 155 can be a software framework for interacting with API 120. Object map program 155 can be a standalone program, a plug-in to a web browser, a portion of another program or otherwise implemented according to suitable software architecture. In one embodiment, object map program 155 can be an Adobe Flash program, a Java program, a scripting language, or an AJAX (Asynchronous JavaScript and XML) application.

In operation, object map program 155 generates a view of objects in repository 105. The object map can be a representation of a dynamically generated relationship graph of the objects generated based on metadata associated with the objects. The view represents objects as nodes in a hierarchy based on relations between the objects. In some cases, the nodes are generic. In other embodiments, the nodes are specific to a object type, a user type or other classification (e.g., a document picture for document items, a picture frame for images and so on). In yet another embodiment, the nodes can present a thumbnail image of the corresponding object, user or other item. The number of nodes rendered at any one time may be limited by program or hardware constraints. According to one embodiment, the object map program renders a configured number of nodes (e.g., max=500 or 2000 or some other number). When a user gets to a leaf node, there can be an indication or icon which shows the user there are more items below the node. For example, a shortcut-type icon which contextually shows that the user is navigating away from the previously rendered part of the object map can be displayed. The user clicks the icon, and that node becomes the root node of the object map and object map program 155 renders the next 500 or 2000 as per configuration. When the object map is not showing home as the root node, a button can be displayed to allow the user to click to home. The object map can be rendered according to a breadth first, depth first or other scheme.

Initially, the view contains limited information about the objects. As the client navigates the view (e.g., by panning, zooming, etc.) object map program 155 sends requests to API 120 to retrieve additional information. Object map program 155 populates the view based on the user's navigation as discussed in more detail below.

In one embodiment, object management system 110 can be a content management system managing content for a website and the objects can include specific content items for the website. Consequently, the object map can be a content map of content of the website.

Figure 2:
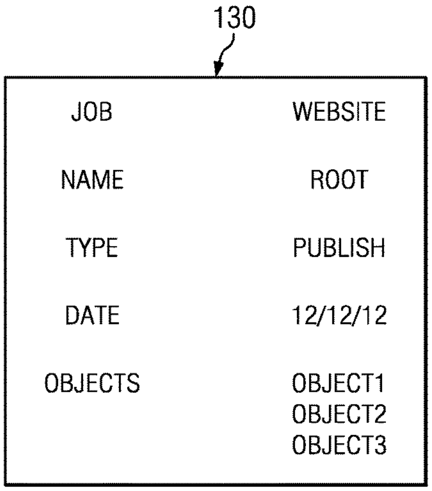
FIG. 2 illustrates an example embodiment of an object.

FIG. 2 is provided by way of an example of a job object 130. The object 130 may have various associated metadata fields. For example, the object 130 may have metadata for a name of the object 130, a type, a date an event is scheduled to take place or has taken place, and associated objects. For example, the object 130 may be associated with a specific website and may be given a name based on the objects within the object 130. Further the object 130 may schedule publishing or unpublishing from the website on given dates. Also, the object 130 may be linked or associated with other objects within the repository 105. The object 130 may have metadata indicating the relationships between the object 130 and other objects.

Figure 3:
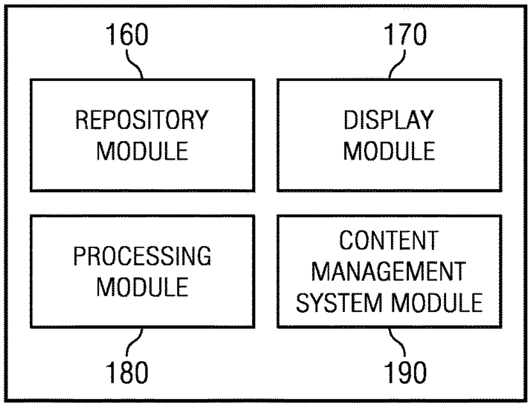
FIG. 3 illustrates an example of object map code.

FIG. 3 illustrates an embodiment of object map code (e.g., object map program 155) at object mapping system 150. The object mapping system 150 may include a plurality of modules or processors such as a repository module 160, a display module 170 and a processing module 180. Further, each of the above mentioned modules may be a processor or device.

The repository module 160 may be configured to retrieve metadata corresponding with a set of objects in the repository 105. Further, the repository module 160 may be configured to modify and/or update the metadata within the repository module 160 based on user actions and/or commands of the graphical user interface on the object map program 155. According to one embodiment, repository module 160 may be an object management system interface module that issues requests to an object management system API.

The display module 170 may be configured to display the graphical user interface of the object management 155 on a display. The display module 170 may automatically update or change the displayed object map program 155 based on the actions and/or commands of the user on the graphical user interface. Accordingly to one embodiment, the display module 170 may receive user input as the user interacts with the graphical interface. The display module, for example, can determine the portion of an object map that the user is attempting to view based on the user's viewing position in the object map and can provide this information to processing module 180. Additionally, display module 170 may receive information provided by processing module 180 and display the information in the appropriate positions in the object map.

The processing module 180 may be configured to determine a first set of nodes representing objects that are displayed on a graphical interface. The processing module 180 may be further configured to request that the object management system 110 take an action on a corresponding object or item in the repository 105 based on an interaction by the user on the displayed nodes as detected by display module 170. According to one embodiment, processing module 180 may receive metadata for objects from repository module 160 and determine the relationships between the objects, thereby determine the co-positions of corresponding nodes in a hierarchy so that display module 170 may appropriately display the nodes for objects.

FIG. 3 is provided by way of example and the various modules described can be portions of separate programs, portions of the same code or may be otherwise implemented. The processes of FIG. 3 may be implemented on a single device or may be distributed across multiple devices.

Figure 4A:
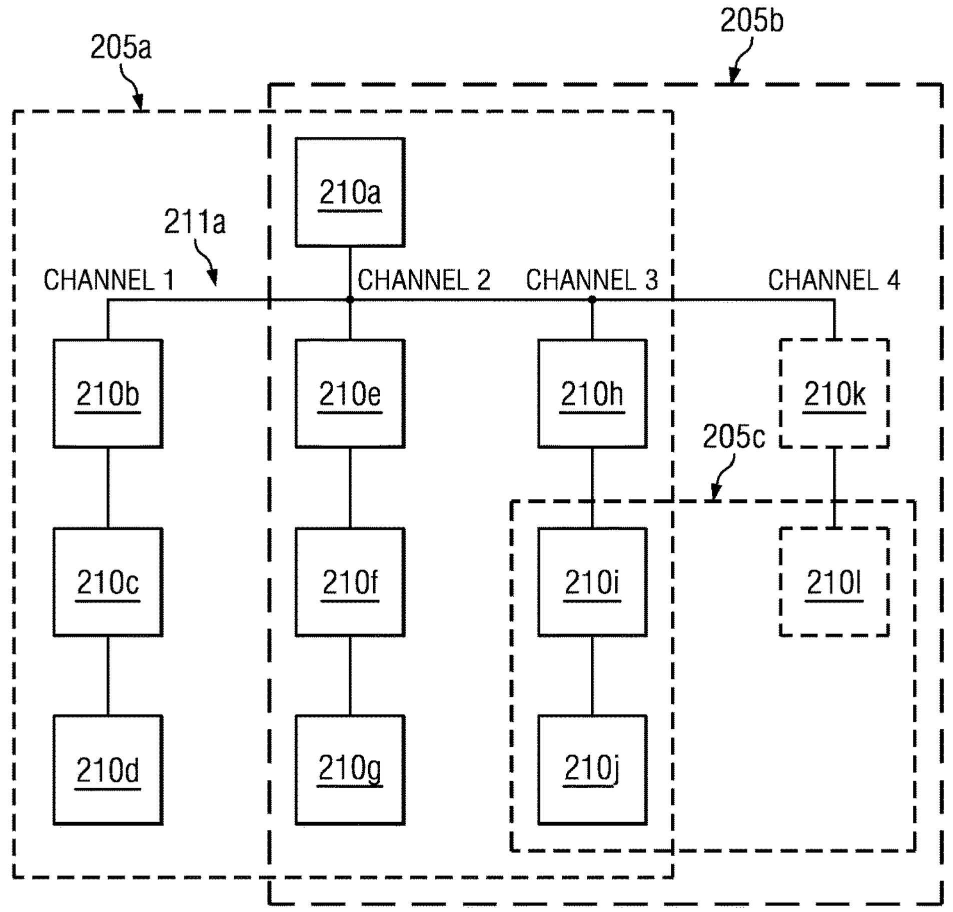
FIG. 4*a* illustrates a view of a set of objects according to an example embodiment.

FIG. 4a illustrates one embodiment of an object map 200 of a set of objects. When a user first opens object map program 155, object map program 155 can build a view from a default root node as defined by, for example, an XML schema. By way of example, object map program 155 may start with a specified web site object 210a and build out the view based on metadata from object management system 110. Assume for example, the metadata or web site object specify that the site has four channels. Object map program 155 can query the object management system 110 for the ids of objects associated with each of the channels to build a object map. Object map program 155 can also query object management system 110 to discover parent child relationships between objects associated with each channel. Object map program 155 can represent objects as nodes 210 and relationships using visual connectors 211, for example connector 211a representing that node 210b is a child node of 210a, and node positioning.

For a large site, the number of nodes may be very large and therefore all the nodes cannot be rendered for the user. According to one embodiment, a rectangle or other arbitrary shape defines a region of interest 205. The region of interest may be defined by the resolution of a display device and may encompass the entire displayed field of view or may be otherwise defined. The object map program 155 can render some nodes in the object map based on an initial or default region of interest but wait until the user navigates to a new area to render other nodes. For example, if the web site has nodes 210a-210m, an initial region of interest 205a may only show nodes 210a-210j in the object map.

As a user pans or otherwise moves the region of interest, the center of the region of interest translates from position to position. Based on the new position in the object map, object map program 155 can request metadata for nodes in the region of interest. For example, if the region of interest is initially 205a and the user pans to the right (e.g., so that the region of interest is depicted by 205b), the object map program can render nodes 210k and 210l. In some embodiments, panning will also result in object map program 155 requesting additional metadata about nodes 210k and 210l.

Upon the object map program 255 requesting additional metadata about nodes 210*k* and 210*l*, the nodes and/or the metadata in the initial area 205*a* may become stale, invalid or no longer needed to display the updated display 205*b*. The object map allows the user to move the region of interest in what appears as a continuous object map.

The region of interest may also be used for speculative loading (i.e., look ahead caching) of information about objects in a predefined region about the region of interest. This can allow for smoother transitions as the user pans about object map 200.

Figure 4B:
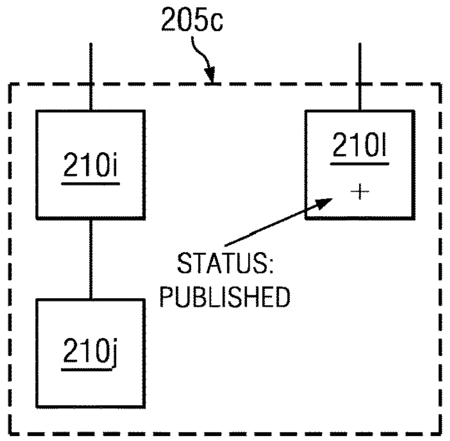
FIG. 4*b* illustrates a view of a set of objects according to an example embodiment.
Figure 4C:
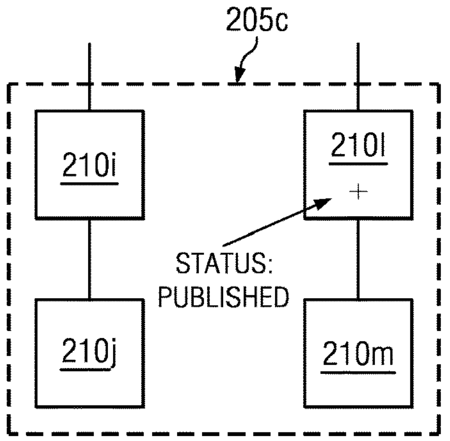
FIG. 4*c* illustrates a view of a set of objects according to an example embodiment.

Additionally, because the user is zoomed out, object map program 155 may only load limited metadata about the displayed nodes 210*a*-210*j*. If the user zooms on a particular portion of the object map, object map program 155 can retrieve additional metadata about the nodes in the area of zoom. For example, if the user zooms to view 205*c* (see FIG. 4*b*), the object map program can request additional metadata regarding nodes 210*i*, 210*j* and 210*l*. This can include re-retrieving metadata previously retrieved for these nodes or only retrieving the additional metadata. The displayed nodes can be changed to reflect this new metadata or another mechanism can be provided for the user to access the metadata. For example, when the user scrolls over node 210, the object map program 155 can detect this interaction within the graphical user interface, and the user can see that the object is published. This metadata may have been unavailable in view 205*b*. Additionally, node 210*l* includes a "+" sign to indicate that there are additional nodes below node 210*l* in the hierarchy (e.g., node 210*m* in FIG. 4*c*) that have not been rendered. If the user clicks on the "+" sign, hovers on the "+" sign or otherwise appropriately interacts with the graphical user interface, object map program 155 can request information about the corresponding objects from object management system 110 (or other system).

Figure 5:
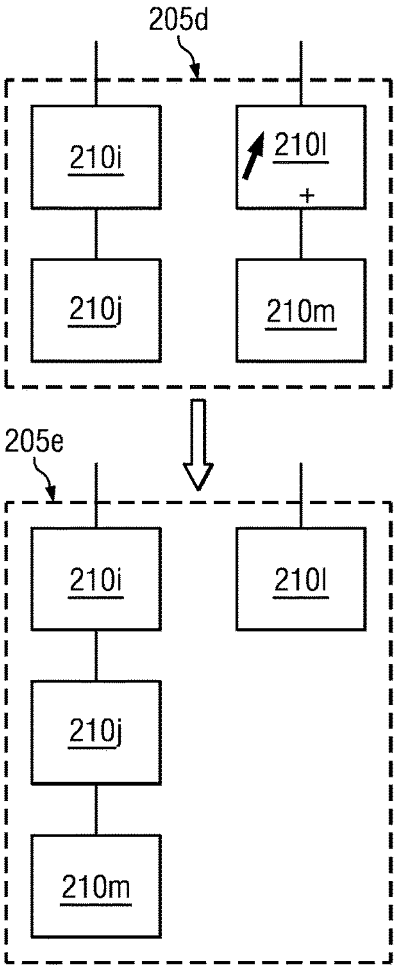
FIG. 5 illustrates views of for managing an object map according to an example embodiment.

Through the object map, a user can take actions on a node. For example, as shown in FIG. 5, a user viewing view 205*e* can drag and drop node 210*m* as shown. Object map program 155 can send API requests to API 120 to update the metadata of object management system 115 to reflect the new relationship between objects. Other action than can be taken include, but are not limited to: Add Node, Delete Node, Publish Node, Approve Node, Move/Reparent Node, Navigate to a Node's "Page" in the Application, Rename Node, Open Editor for Channel, Preview node or other actions. The actions that can be taken can depend on the level of zoom. In other embodiments, all actions can be available at all levels of zoom. In some cases, taking an action may initiate another program or process. For example, a selection to publish a node may cause opening of a separate publishing application/dialog.

Additionally, the user can view various state information about an object including, but not limited to, whether the object is: Empty/Populated, Un/Approved, In/Active, Un/Published, Un/Locked (e.g., for editing, and whether an Error Condition exists for a node. Again, the status information available for a node can depend on the level of zoom, the type of object or other factors.

Figure 6B:
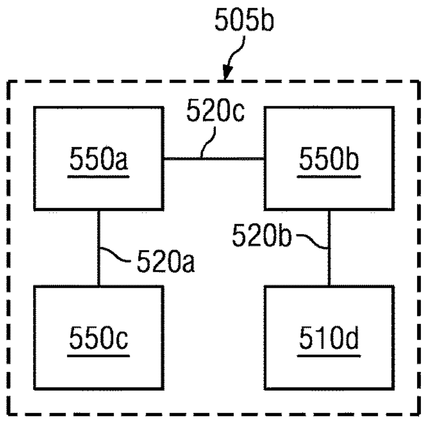
FIG. 6*b* illustrates a view of a set of objects according to an example embodiment.
Figure 6A:
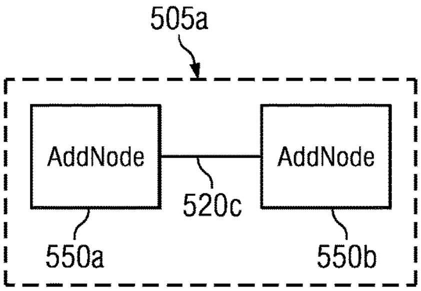
FIG. 6*a* illustrates a view of a set of objects according to an example embodiment.

FIGS. 6*a-b* represents an embodiment of a user adding an object to existing objects. In the embodiment in FIG. 6*a*, an initial view 505*a* on the graphical user interface may have sibling nodes 550*a* and 550*b* and this relationship may be represented by link 520*c*. If a user scrolls over node 550*a*, the object map program may display additional actions that may be taken on node 550*a*. For example, the graphical user interface may display an Add Node feature for object 550*a*. If the user selects an Add Node feature of object 550*a* in FIG. 6*b*, a new node child object 550*c* may be created for object 550*a*. Also, if a user of the graphical user interface scrolls over node 550*b*, the graphical user interface may display an Add Node feature for object 550*b*. If the user selects an Add Node feature of object 550*b* in FIG. 6*a*, a new node child object 550*d* may be created for object 550*b*.

Resulting from a user adding new child objects for objects 550*a* and 550*b* in FIG. 6*a*, the graphical user interface may display a view as shown in FIG. 6*b*. In the embodiment as shown in FIG. 6*b*, object 550*c* represents a child node of object 550*a*. Furthermore, this relationship between object 550*a* and 550*c* is represented by link 520*a*. Also in the embodiment as shown in FIG. 6*b*, object 510*d* represents a child node of object 510*b*. Furthermore, the relationship between object 510*b* and 510*d* is represented by link 520*b*.

Additionally, while the object map program transfers from the view as illustrated in 6*a* to the view in FIG. 6*b*, it may populate metadata in the repository 105 regarding modified and new objects. For example, the object map program may include metadata in the repository 105 for objects 510*a-d* indicating the relationships between objects 510*a* and 510*c* and objects 510*b* and 510*d*.

Additionally, object map program 155 can open dialogs to allow the user to upload or create objects corresponding to the new nodes. This may include initializing other programs to allow for object creation.

In some cases, the status and action affordances become difficult at zoomed-out (small) node sizes. According to one embodiment, a maximum zoom out can be set that will enable some minimum level of status to show so that the text size never becomes illegible. The level at which text disappears can be set as a user preference in some embodiments. In other embodiments, status and actions can be made available at any zoom level by right clicking on a node. If the status or available actions are not already available, object map program 155 can request them from object management system 110. Additionally, the nodes may change based on the level of zoom. For example, at a high level (zoomed out), the nodes may be generic. At a particular level of zoom the nodes may become specific to the object type or be changed to include thumbnails of the corresponding object items. The field of view can correspond to the entire display area rendered by object map program 155 on a display device of portion thereof Thus, according to one embodiment, the object map program 155 renders nodes and loads metadata for the nodes based on field of view of the user and/or the level of zoom. For nodes that are no longer in the field of view, metadata can be overwritten or removed from memory. Similarly, if the zoom level changes, metadata for higher levels of zoom can be overwritten or removed for memory. In other words, embodiments described herein may utilize lazy loading based on field of view and/or zoom level of a site map of objects in a object management system 110.

In the foregoing example, the object map was rendered based on parent/child relationships between objects. However, object map program can use other dimensions of metadata to render the object map. For example, the object map may represent the navigational structure of a Web site (e.g., as a sitemap). The object map may also be a classification or taxonomic view of the topics contained within the set of object. The object map might also represent relative relationships of items, using an arbitrary node as the root or center of interest, and showing the map of relationships—those referencing it by link, implicit or explicit "incoming" relationships (items referring to the item of interest), and by link, implicit or explicit "outgoing" relationships (items it references). Thus, the object map can represent the objects based on various dimensions of metadata. Further, users of the graphical user interface may be responsible for creating, modifying or forming the relationships defining the object map and the content of each of the objects in the object map. For example, users may modify the metadata representing the relationship between two objects, thus modifying the dimensions and/or layout of the object map. More so, users may be required to upload or create the content for each of the objects within the object maps.

Figure 7:
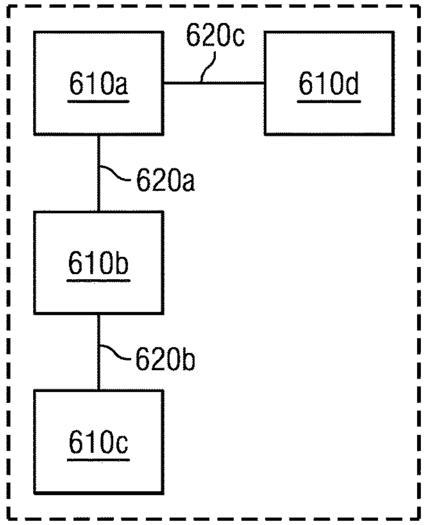
FIG. 7 illustrates a view illustrating relationships between objects in an object map.

Further, the relationships between the objects within the object map may be represented by links representing parent/child, sibling or other relationships between the objects. FIG. 7 is a diagrammatic representation of objects 610*a-d* and their navigation links to each other in a site map. For example, object 610*a* references 610*b*. Further, this relationship is represented by link 620*a* in FIG. 7. Also in FIG. 7, object 610*b* references 610*c* and this relationship is represented by link 620*b*. Further in FIG. 7, object 610*a* references object 610*d* and this relationship is illustrated by link 620*c*. The organizational hierarchy of each object, such the parent/child/sibling relationships between objects may either be explicit in metadata for each associated object or derived from metadata from each associated object or metadata.

Each of the objects 610*a-d*, in this example, may be an entire web page, a component of a web page, a place holder for a website that is to publish at a later date, content such as documents or images, a link to another web page or any other related object. Accordingly, object 610*a* may represent a root node or a home page for a website. Further, object 610*b* may represent an additional web page for a site that a user may navigate. Also, object 610*b* may connect to related websites or other objects through the sibling object 610*d* represented by link 620*c*.

Figure 8:
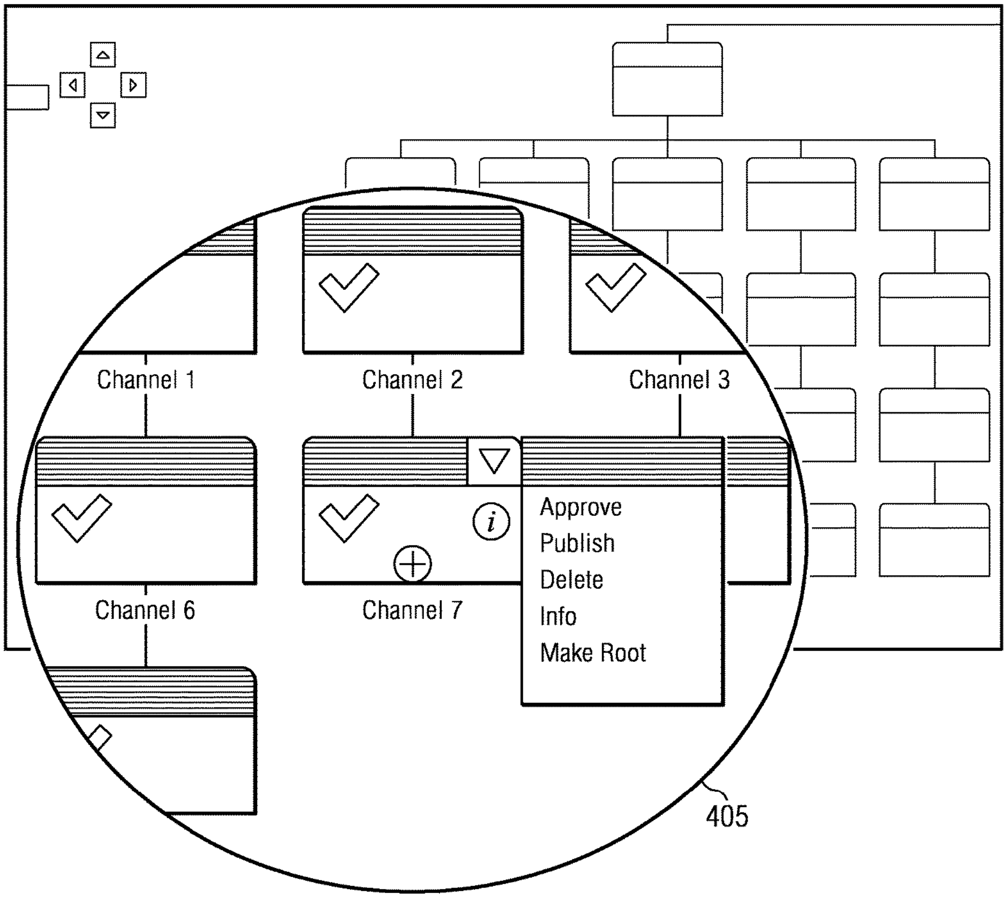
FIG. 8 is a diagrammatic representation of an embodiment of a graphic user interface according to an example embodiment.

In one embodiment, object map program 155 can allow a user to see various levels of detail for object. FIG. 8 is a diagrammatic representation of one embodiment of a graphic user interface illustrating one embodiment of a "magnifying glass" zoom feature 405 that zooms on particular nodes. The magnifying glass is a region of interest with an additional level of zoom. As the magnifying glass pans over nodes, object map program 155 can adjust the nodes for the appropriate level of zoom (i.e., making them appear larger) and request additional metadata for the nodes in the magnifying glass. As can be seen in FIG. 8, nodes displayed in feature 405 display additional features such as a drop down action menu, and "information" icon and an icon indicating additional nodes below. These features, according to one embodiment, are not accessible when the zoom is not applied to the node. If the user clicks on the "i" info icon, a properties or details view can display. A flip+grow animation can be used, such that the channel node appears to flip 180 degree on the z axis and grows to fill ⅔rds of the screen. The user is able to: view additional metadata, view object assigned to the channel, perform actions against the channel (approve, publish), perform actions against the object (approve, publish, un-assign from channel) etc. The checkmark icon can provide an easily discernable visual indicator of whether the object corresponding to the node is approved. By clicking on the check mark, the user can approve the corresponding object.

As discussed above, as the user navigates the object map by panning and zooming, object map program 155 can request additional metadata from object management 110. According to one embodiment, object map program 155 can send requests for additional metadata using URL requests of Table 1. These requests are compatible with APIs for a Vignette Content Management System or Open Text Web Experience Management System.

TABLE 1

| | View Type | REST URL |
|---|---|---|
| Login | xml | /login?username=admin&password=admin |
| Get all projects | xml, xhtml | /listProjects |
| Get the Diagnostics | xml | /xmlDiagnostic |
| List all automations | xml | /listAutomations |
| Get all categories | xml | /listCategories |
| Get all common metadata | xml, xhtml | /getMetadata |
| List all sites | xml | /listSites |
| Get all channels for the selected site | xml | /listSiteChannels?siteId=55bb000a4b6f3110VgnVCM100000d22315acRCRD |
| Associate content item to channels | xml | /assignChannels?contentInstanceId=4038650346144110VgnVCM100000782515acRCRD&channelId=7948f1b21d344110VgnVCM100000782515acRCRD&channelId= 0448f1b21d344110VgnVCM100000782515acRCRD |
| Unassign channels | xml | /unAssignChannels?id=4038650346144110VgnVCM100000782515acRCRD&channelId=7948f1b21d344110VgnVCM100000782515ac |
| Assign categories to Content item | xml | /assignCategories?id=1503ddc9261f3110VgnVCM100000d42415acRCRD&categoryPath=/test1-category&categoryPath=/test2-category |
| Unassign categories | xml | /unAssignCategories?id=1503ddc9261f3110VgnVCM100000d42415acRCRD&categoryPath=/test1-category&categoryPath=/test2-category |
| Approve Content item | xml, json | /approveItem?id=4bd2ddc9261f3110VgnVCM100000d42415acRCRD |
| View Approval status | xml | /viewItemStatus?id=22e81735b38f3110VgnVCM100000d42415acRCRD |
| View Content item details | xml | /getItem?id=22e81735b38f3110VgnVCM100000d42415acRCRD |
| Delete the content item | xml, json | /deleteItem?id=22e81735b38f3110VgnVCM100000d42415acRCRD |
| Touch a content item to update time | json | /touchItem?id=22e81735b38f3110VgnVCM100000d42415acRCRD |
| Publish content item | xml | /publish?id=4bd2ddc9261f3110VgnVCM100000d42415acRCRD |
| Unpublish Content Item | xml | /unpublish?id=4bd2ddc9261f3110VgnVCM100000d42415acRCRD |
| Version content item | xml | /createVersion?id=4bd2ddc9261f3110VgnVCM100000d42415acRCRD&label=<label>&comment=<comment> |
| Version content item | xml | /restoreVersion?id=4bd2ddc9261f3110VgnVCM100000d42415acRCRD&versionNum=1 |
| List all versions of the content item | xml | /listVersion?id=4bd2ddc9261f3110VgnVCM100000d42415acRCRD |
| Get details of the selected version | xml | /getVersionItem?id=22e81735b38f3110VgnVCM100000d42415acRCRD&versionNum=4 |
| Delete a Version for a content item | json | /deleteVersion?id=4bd2ddc9261f3110VgnVCM100000d42415acRCRD&versionNum=1 |
| Show recent static files added by user | xml | /getRecentFiles?user=vgnadmin&maxCount=5 |
| Filter | xml | /filter |
| Search | xml | /search?keyword=sampleImage |
| Add an item to shelf | json | /addShelf?id=22e81735b38f3110VgnVCM100000d42415acRCRD |
| Remove an item from shelf | json | /removeShelf?id=22e81735b38f3110VgnVCM100000d42415acRCRD |
| Gets the shelf details for given filter criteria | xhtml | /ShelfFilterDetails?filtercriteria=All&selectedCategory=Recent |
| Create Content Item | xml | /createItem |
| Update Content Item | xml | /updateItem |
| Upload multiple media items | json | /uploadMediaItems |
| Edit Image | json | /editImage?id=22e81735b38f3110VgnVCM100000d42415acRCRD&imageName=<imageName>&sourcebase64=<sourcebase64> |

TABLE 1-continued

| | View Type | REST URL |
|---|---|---|
| Resize Image | json | /resizeImage?sourceImage=<sourceImage>&actionName=<actionName>&width=<width>&height=<height>&placementPath=<placementPath> |
| Resubmit file | json | /resubmitFile?placementPath=<placementPath> |
| To upload a static file | json | /uploadStaticFile?projectPath=<projectPath> |
| Get Tags with the specified pattern | json | /getTag?pattern=<pattern> |
| Edit tag for a content item | json | /editTag?id=22e81735b38f3110VgnVCM100000d42415acRCRD&tag=<newtag>&oldTagString=<oldTagString> |
| Display Tag for a content item | json | /displayTag?id=22e81735b38f3110VgnVCM100000d42415acRCRD |
| Get items with the tag name | xml | /displayTagSearch?tagName=<tagName> |
| Render a static file with the given placement path and version number | xml | /renderFile?placementPath=/RichMediaSample/Assets/Images/lit__tn.jpg&versionNum=0 |
| Get richmedia Home Page Items | xml | /HomeItem |

For example, if a user zooms to a level where approval status is available, the content map program can send the request "/viewItemStatus?id=22e81735b38f3110VgnVCM100000d42415acRCRD" to request the approval status for object "22e81735b38f3110VgnVCM100000d42415acRCRD." When the user zooms out or moves to a different part of the object map, the approval status for object 22e81735b38f3110VgnVCM100000d42415acRCRD can be allowed to go stale at the object mapping system 150.

Requests can also be sent to perform actions. The following is a list of example action requests:

```
<approveurlt type =“httpAPI”>/contentservices/xapi/xml/approveItem?
id=<approveurl>
<unapproveurltype=
“httpAPI“>/contentservices/xapi/xml/unApproveItem?id=</unapproveurl>
<editurl type=“invokeEvent”>doEdit</editurl>
<deleteurltype=“httpAPI”>/contentservices/xapi/xml/deleteItem?id=
</deleteurl>
<automationurl
type=“invokeEvent”>automationsList</automationurl><TBD>
<publishurl type=“invokeEvent”>publishItem</publishurl>
<unpublishurl type=“invokeEvent”>unPublishItem</unpublishurl>
```

Table 1 is provided by way of example and not all actions may be available through object map program 155 and, in other embodiments, other actions/information may be available. Additionally, the requests can be modified for other APIs or interfaces.

Those of ordinary skill in the art will understand that object management system 110 can be configured to return specified metadata based on defined request structures. For example, a request

```
[monthdataurl]?typeid=[typeid]&classid=[classid]&statusid=
[statusid]&eventid=[eventid]&initialdate=[yyyy-mm-dd]&finaldate=
[yyyy-mm-dd]
```

can cause object management system 110 to return information about all nodes that meet the specified parameters. This may include information that could be individually requested using the requests of Table 1 and other information. For example, requests can be defined so that object management system 110 returns information to identify all the nodes of a site and their relationships. Additional requests can be defined so that object management system 110 returns specified information about some subset of the nodes (e.g., the nodes being viewed). The manner in which requests and responses are defined can balance a tradeoff between the number of requests and the amount of information processed by object management program 155 at any one time.

Any number of additional features can be displayed based on the nodes viewed and level of zoom. For example, the object map program can display a "heat map" for each node when a certain level of zoom is reached with the heat map indicating relative activity on the object over a period of time. The heat map can be derived from the metadata provided by the object management system 110.

Embodiments described herein thus provide a system for visualizing and managing objects for a web site. A site map can be rendered (potentially limited to a certain number of nodes) corresponding to objects in a web site. As the user navigates the site map, the nodes for which data is loaded can change. As the user zooms on particular nodes, the metadata and actions provided can change.

Figure 9:
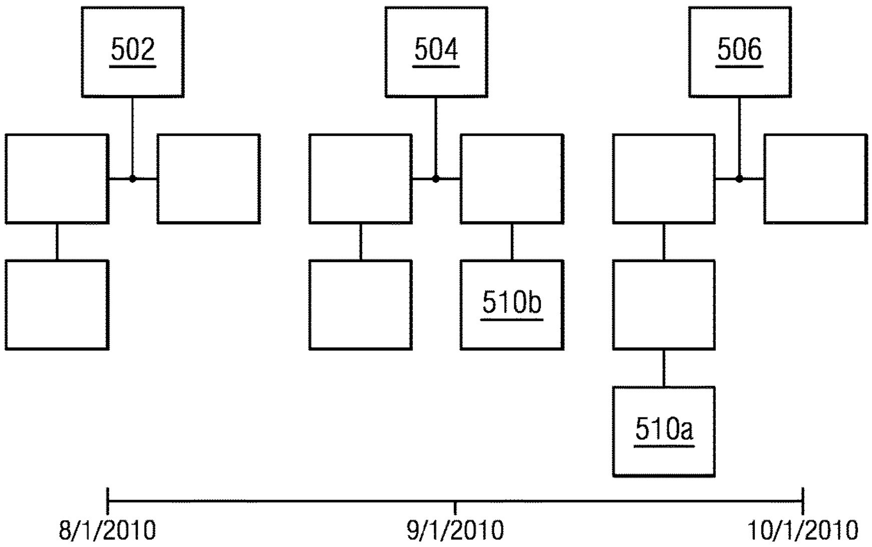
FIG. 9 illustrates a method of managing an object map according to an example embodiment.

In some cases, it may be useful to see how a hierarchy has changed/will change over time. For example, a hierarchy can be displayed as the hierarchy will exist at a future date assuming scheduled jobs take place. Additionally, object map program 155 can display hierarchies as they existed on previous dates. According to one embodiment, the hierarchies can be displayed along a scrollable timeline. In one embodiment, information for the hierarchies on the scrollable timeline can be lazy loaded as the user scrolls to a particular date. FIG. 9, for example, is a diagrammatic representation of a timeline view showing hierarchies 502, 504 and 506 on certain dates. Timeline 502 represents a past state, timeline 504 represents a current state and timeline 506 represents a future states based on specified events (e.g., approval, publication or other event). Thus, for example, hierarchy 506 represents the hierarchy of the web site if scheduled events for publishing a object item corresponding to node 510*a* and unpublishing a object item corresponding to node 510*b* occur.

In one embodiment, object map program 155 can query object management system 110 for the identity of nodes associated with a web site and the publication status on a particular date to render hierarchies 502, 504 and 506. Object map program 155 can further query object management system 110 for nodes associated with the web site having publish/unpublish events occurring between the present date and the future date of interest. In another embodiment, object map program 155 can request information for objects associated with the web site and perform its own filtering of which nodes will published/unpublished over the time period.

Additionally, object map program 155 can provide a timeline of events on object items. The timeline can be displayed and interacted with as described, for example, in U.S. Provisional Patent Application No. 61/387,779, entitled "System and Method for Timeline Management of Content", which is hereby fully incorporated by reference herein. Such a timeline can be displayed in the same display as the object map or on a different page or window.

Object map program 155 can provide a number of other features for viewing items. For example, a user can compare nodes from a date range against another date range (what did we do last year for our versus this year. The comparisons can be shown as overlays of hierarchies, including for example, what the hierarchy looked like as of different dates. Object map program 155 can also allow a user to filter information. According to one embodiment, the user can be given the option to filter the displayed by the type of event that occurred/to occur on each date (modified, created, scheduled publish, scheduled unpublished, last published, last unpublished or other action), media class (asset, banner, object, feature, gallery, news, promotion, teaser or other defined class), status (approved/unapproved, published/unpublished or other status), object item type (image, file, video, rich component or other item type), time (today, yesterday, past 7 days, next 7 days, or other time specification) or other information about a object item (e.g., locale). Thus, for example, the user can request a view that shows only images with approved status.

Object map program 155 can send requests to object management 110 based on the item type (e.g., images) and options/filters selected. Thus, for example, if a media class asset filter is applied, timeline program 155 can request data for all images of the asset class associated with the web site. If the user switches the asset class, object map program 155 can send another request.

In another embodiment, object map program 155 can request all (or some subset) of metadata for the web site and perform the filtering on the metadata without making a separate request when the user changes the asset class or other parameter. This can improve performance of the filtering experience. Additionally, according to one embodiment, object map program 155 can register to be notified of changes by the object management system 110. In other words, object map program 155 can establish a connection and register for updates since it last received data to drive the display. Then, if object management system 110 modifies any of the data, it can "push" or notify registered clients that the changes took place. This can be done either where the connections are established as needed over time or where the client establishes the connection and maintains it for the notifications.

Figure 10:
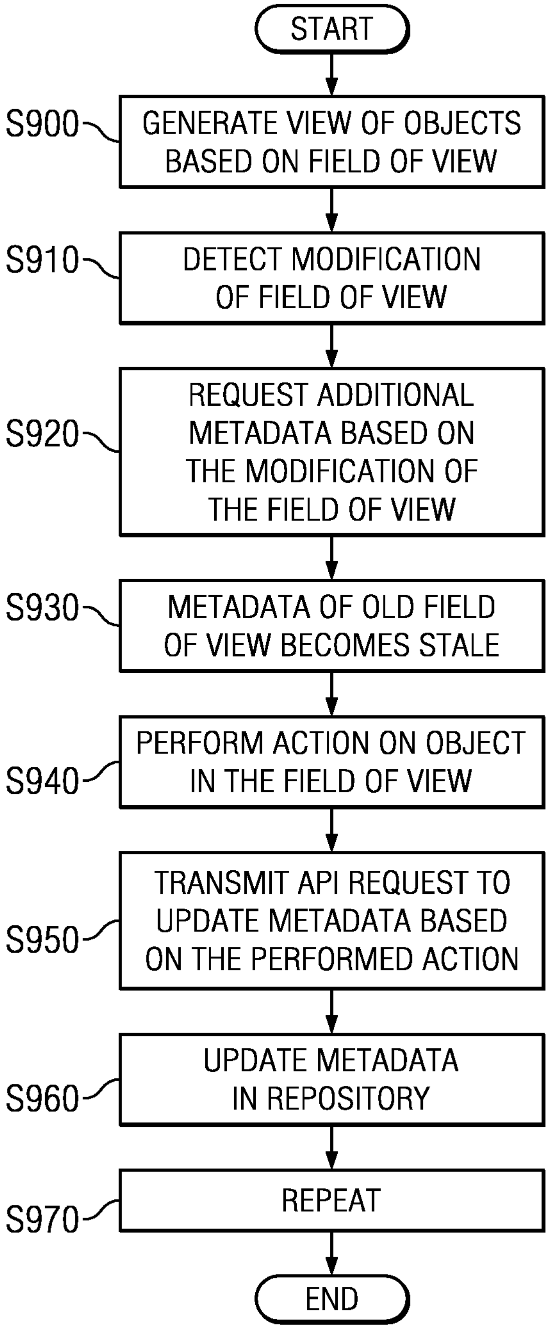
FIG. 10 illustrates a flow diagram representing a method for managing an object map according to an example embodiment.

FIG. 10 is a flow diagram representing one embodiment of a process of presenting an object map.

In S900, the object map program 155 may generate a view of objects in the repository 105 based on a default view. Object map program 155 can request object ids for objects meeting default criteria and metadata about the objects. Object map program determines the relationships between the objects and dynamically builds a relationship graph for the objects and displays the object map corresponding to the relationship graph.

In S910, a user interaction with the graphical user interface that modifies the viewing position or region of interest in the object map in the graphical user interface can be detected. For example, the user may pan to the left or right on the graphical user interface, or change a level of zoom on the graphical user interface. The detection of the region of interest relative to a map in a graphical user interface can be done using methods known or developed in the art to detect pan/zoom or other such action taken in a graphical user interface.

In S920, based on the user modifying the new position of the region of interest in the object map, the object map system 155 may request additional metadata of new or additional nodes within the region of interest. Furthermore, if the level of zoom of the viewing position of the object map has been increased, the object map program may request additional metadata regarding the objects within the field of view.

In S930, to conserve system resources metadata associated with objects that no longer within the region of interest are allowed to become stale within the object management system 110.

In S940, user interactions in the graphical user interface can be detected that correspond to various actions on an object. For example, a user may interact with the graphical user interface to change the relationship between objects from a child to a sibling or a parent. Also, the user may interact with the graphical user interface to publish or unpublish an object, or change the time and/or date that the object to publish or to be unpublished.

In S950, the object map program 155 may transmit or send an API request to the API 120 to update the metadata of the objects in the object map system 115 to reflect the actions taken by an object on the graphical user interface.

In S960, objects in the repository 105 may be updated based on the API request in S950 and the modifications to the objects in S940. For example, the object map may be updated to reflect the changes to the relationships between the objects.

In S960, the steps of FIG. 10 may be repeated as needed or desired. Furthermore, in other embodiments the steps of FIG. 10 may be repeated or performed in various orders.

While the above embodiments have been discussed in terms of managing objects for a web site, embodiments can also be applied to other workflows and items. For example, a view can show a contract that needs legal approval, a blog entry, or policy that needs to be printed by a certain date, a response to a Freedom of Information Act request) or other item that requires an action. Thus, for example, various types of items can be included on a view of a project. Thus, the hierarchy can show the documents that must be approved, the objects that need to published, regulatory documents that need to be filed by users in an organizational hierarchy.

Embodiments described herein provide a significant reduction in effort in managing projects. Because workflow information is presented in an easy to understand format with workflow actions and statuses accessible through the hierarchy, the user can access objects and take actions on the objects with a reduced number of clicks. For a large website, this can significantly reduce the amount of time needed to deploy and maintain a site.

Embodiments described herein can be implemented in a computing environment having one or more client machines connected to one or more servers by a network. The network can be characterized as an internal network and/or external network. The Internet might be an example of an external network and a company's intranet might be an example of an internal network. Each network can be bi-directionally coupled to a variety of networked systems, devices, repositories, etc.

Virtually any piece of hardware or electronic device capable of running appropriate software may be a server or client. As an example, a computer may include a central processing unit (CPU), read-only memory (ROM), random access memory (RAM), hard drive or non-volatile memory, and input/output (I/O) device(s). An I/O device may be a keyboard, monitor, printer, electronic pointing device (e.g., mouse, trackball, etc.), or the like. The hardware configuration of the computer can be representative to other devices and computers alike coupled to the network (e.g., desktop computers, laptop computers, personal digital assistants, handheld computers, cellular phones, and any electronic devices capable of storing and processing information and network communication.

Figure 11:
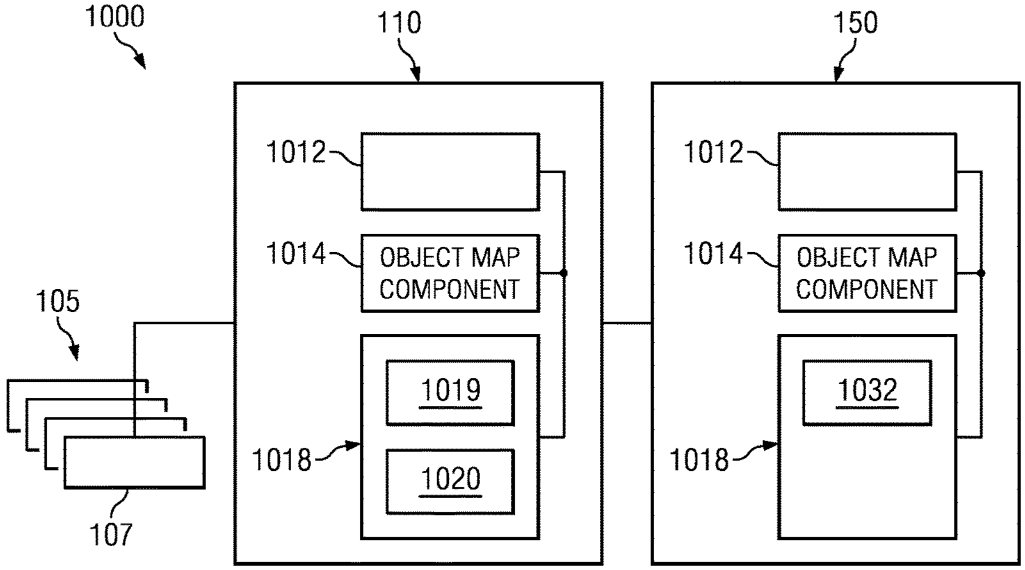
FIG. 11 represents an embodiment of a system for implementing an object map system.

FIG. 11 is a block diagram illustrating one embodiment of a computing environment 1000 with object management system 110. Computing environment 1000 includes an object repository 105 storing objects 107. Object repository 105 can comprise a file server or database system or other storage mechanism remotely or locally accessible by object management system 110.

In the embodiment of FIG. 11, object management system 110 comprises a server having a central processing unit 1012 connected to a memory 1014 and storage 1018 via a bus. Central processing unit 1012 may represent a single processor, multiple processors, a processor(s) with multiple processing cores and the like. Memory 1014 may be configured to store program code for the object map system 155 to communicate with the repository 105 and the object mapping system 150. Storage 1018 may include a non-transitory storage medium such as hard-disk drives, flash memory devices, optical media and the like. Object management system 110 may be connected to a data communications network.

Storage 1018 stores computer executable instructions 1019 and an application program interface 1020. Computer executable instructions 1019 can represent multiple programs and operating system code configured to communicate with the repository 105 and the object mapping system 150.

Object mapping system 150 may include similar components as the server of search system 110, such as a CPU, memory and storage. Additionally, as shown object mapping system 150 may include executable instructions 1032 within a storage 1018 to provide a view of the object management system on a display of the object mapping system 150. Further, the object mapping system 150 may contain a memory 1012 to locally store the object map component 155. Object mapping system 150 is merely an example of a computing system and embodiments of a search system that may be implemented using other computing systems (e.g., desktop computers, laptops, mobile computing devices or other computing devices with adequate processing and memory) including multiple computers acting together to provide a search system (e.g., a cluster of servers or other computing devices connected by a network acting together to provide the search system).

Embodiments disclosed herein may be implemented in suitable software including computer-executable instructions. As one skilled in the art can appreciate, a computer program product implementing an embodiment disclosed herein may comprise one or more non-transitory computer readable storage media storing computer instructions translatable by one or more processors in a computing environment. Examples of computer readable media may include, but are not limited to, volatile and non-volatile computer memories and storage devices such as ROM, RAM, HD, direct access storage device arrays, magnetic tapes, floppy diskettes, optical storage devices, etc. In an illustrative embodiment, some or all of the software components may reside on a single server computer or on any combination of separate server computers.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A system for managing objects comprising:

a server providing an object management system managing objects in a repository and an application program interface for interfacing with the object management system, the objects in the repository comprising web site content objects for a web site linked together to form a site structure for the web site; and an object mapping system coupled to the server over a network, the object mapping system capable of rendering object maps using multiple dimensions of object metadata, the object metadata comprising content management metadata, the object mapping system configured to:

load, through the application programming interface, a first set of object metadata for a first set of objects from the web site content objects, the first set of objects corresponding to a first region of interest;

dynamically generate from the first set of object metadata for the first set of objects a hierarchical relationship graph for the first set of objects;

render, in a graphical user interface, a first view of an object map representing the dynamically generated relationship graph, the first view representing the first set of objects as a first set of nodes in a current hierarchy and relationships between the objects in the first set of objects as links between the nodes in the first set of nodes;

based on a user input to zoom to an area of zoom in the object map:

determine a subset of nodes from the first set of nodes corresponding to the area of zoom;

load, from the server, a second set of metadata for each node in the subset of nodes, the second set of metadata including content management metadata for each node in the subset of nodes; and re-render the subset of nodes in the area of zoom with the nodes in the subset of nodes updated to reflect the second set of metadata;

based on a user input to select a second region of interest at a new position:

determine a second set of objects in the repository associated with the second region of interest at the new position:

retrieve, through the application program interface, metadata stored in the repository for the second set of objects in the repository, wherein an amount of metadata retrieved from the repository for a given object of the second set of objects is based on a level of zoom from a plurality of levels of zoom;

display in the graphical user interface a modified view, the modified view including a second set of nodes representing the second set of objects in the repository and links representing relationships stored in the repository between the objects within the second set of objects as part of a continuous object map with the first set of nodes;

based on detecting user interaction with a first selected node in the object map, display in visual association with the first selected node, available actions performable on a corresponding object within the repository represented by the first selected node;

based on detecting a further user interaction with the first selected node in the object map, generate a request to perform a user selected action on the corresponding object represented by the first selected node;

determine a future state of objects of the first set of objects for a selected future time period based on one or more events scheduled for the first set of objects in the future;

determine a future hierarchy of the objects in the first set of objects based on the future state of objects in the first set of objects;

display the current hierarchy and the future hierarchy on a scrollable timeline in the graphical user interface based on the selected future time period in the graphical user interface, where the display includes nodes representing the first set of objects and links representing the relationships between the first set of objects when the one or more scheduled events occur; and based on user interaction with the graphical user interface, display in the graphical user interface in connection with an object of the first set of objects or second set of objects, one or more fields of metadata associated with that object, the one or more fields of metadata including one or more of: a workflow status of the object, a publication status of the object, an approval status of the object, a sequence of related projects to the object, scheduling information regarding the object, or a due date for events associated with the object.

2. The system for managing objects of claim 1, wherein the user selected action comprises modifying the metadata of the corresponding object represented by the first selected node.

3. The system for managing objects of claim 2, wherein modifying the metadata of the corresponding object represented by the first selected node changes a relationship between at least two objects in the first set of objects.

4. The system for managing objects of claim 1, wherein the object mapping system is further configured to display, in the graphical user interface, more or less metadata for each of the first set of nodes based on a level of zoom for the first view, wherein as the level of zoom for the first view increases an amount of the displayed metadata increases and as the level of zoom for the first view decreases the amount of the displayed metadata decreases.

5. The system for managing objects of claim 1, wherein the object mapping system is configured to engage in speculative precaching of metadata from the repository, wherein engaging in speculative precaching of metadata comprises:

determining an extended region of interest based upon the first region of interest, wherein the extended region of interest comprises one or more objects surrounding the first region of interest but not residing in the first region of interest; and loading metadata for objects within the extended region of interest into the object mapping system without immediately displaying objects in extended region of interest that are not also within the first region of interest.

6. The system for managing objects of claim 1 wherein the object mapping system is configured to display a heat map for each object, the heat map indicating relative activity regarding the object over a period of time.

7. The system for managing objects of claim 1 wherein the repository contains a reference to an object stored on another server.

8. The system for managing objects of claim 1 wherein the object mapping system is configured to display an overlay of a first hierarchy of objects with a second hierarchy of objects in the graphical user interface, wherein displaying the overlay provides a comparison of the first and second hierarchy of objects.

9. A method of managing an object map, the method comprising:

storing objects in a repository of an object management system, the objects in the repository comprising web site content objects for a web site linked together to form a site structure for the web site;

load, through an application programming interface, a first set of object metadata for a first set of objects from the web site content objects, the first set of objects corresponding to a first region of interest;

dynamically generate from the first set of object metadata for the first set of objects a hierarchical relationship graph for the first set of objects;

displaying, by an object mapping system, in a graphical user interface, a first view of an object map representing the dynamically generated relationship graph, the first view representing the first set of objects as a first set of nodes in a current hierarchy and relationships between the objects in the first set of objects as links between the nodes in the first set of nodes based on a user input to zoom to an area of zoom in the object map:

determining a subset of nodes from the first set of nodes corresponding to the area of zoom;

loading, from a server, a second set of metadata for each node in the subset of nodes, the second set of metadata including content management metadata for each node in the subset of nodes; and re-rendering the subset of nodes in the area of zoom with the nodes in the subset of nodes updated to reflect the second set of metadata;

based on a user input to select a second region of interest:

determining that the region of interest in the object map has changed to a new position, wherein a second set of objects in the repository is associated with the second region of interest at the new position;

retrieving through the application program interface metadata stored in the repository for the second set of objects in the repository, wherein an amount of metadata retrieved from the repository for a given object of the second set of objects is based on a level of zoom;

displaying in the graphical user interface a modified view, the modified view including nodes representing the second set of objects in the repository and links representing the relationships stored in the repository between the objects within the second set of objects as part of a continuous object map with the first set of nodes;

based on detecting user interaction with a first selected node in the object map, display in visual association with the first selected node, available actions performable on a corresponding object within the repository represented by the first selected node;

based on detecting a further user interaction with the first selected node in the object map, generating a request to perform a user selected action on the corresponding object represented by the first selected node;

determining a future state of objects of the first set of objects for a selected future time period based on one or more events scheduled for the first set of objects in the future;

determining a future hierarchy of the objects in the first set of objects based on the future state of objects in the first set of objects;

displaying the current hierarchy and the future hierarchy on a scrollable timeline in the graphical user interface based on the selected future time period in the graphical user interface, where the display includes nodes representing the first set of objects and links representing the relationships between the first set of objects when the one or more scheduled events occur; and based on user interaction with the graphical user interface, displaying in the graphical user interface in connection with an object of the first set of objects or second set of objects, one or more fields of metadata associated with that object, the one or more fields of metadata including one or more of: a workflow status of the object, a publication status of the object, an approval status of the object, a sequence of related projects to the object, scheduling information regarding the object, or a due date for events associated with the object.

10. The method of claim 9, wherein the performing the user selected action comprises modifying the metadata of the corresponding object represented by the first selected node.

11. The method of claim 10, wherein modifying the metadata of the corresponding object represented by the first selected node changes a relationship between at least two objects in the first set of objects.

12. The method of claim 9, further comprising displaying, in the graphical user interface, more or less metadata for each of the first set of nodes based on a level of zoom for the first view, wherein as the level of zoom for the first view increases an amount of the displayed metadata increases and as the level of zoom for the first view decreases the amount of the displayed metadata decreases.

13. The method of claim 9, further comprising speculative precaching metadata, wherein speculative precaching metadata comprises:

determining an extended region of interest based upon the first region of interest, wherein the extended region of interest comprises one or more objects surrounding the first region of interest but not residing in the first region of interest; and loading metadata for objects within the extended region of interest without immediately displaying objects in extended region of interest that are not also within the first region of interest.

14. A non-transitory computer readable medium comprising at least one computer-readable storage medium having computer-readable program code stored therein, the computer readable program code executable to:

provide an object mapping system capable of rendering object maps using multiple dimensions of object metadata;

connect to a server that provides an object management system managing objects in a repository and an application program interface for interfacing with the object management system, the objects in the repository comprising web site content objects for a web site linked together to form a site structure for the web site;

load, through the application programming interface, a first set of object metadata for a first set of objects from the web site content objects, the first set of objects corresponding to a first region of interest;

dynamically generate from the first set of object metadata for the first set of objects a hierarchical relationship graph for the first set of objects;

render, in a graphical user interface, a first view of an object map representing the dynamically generated relationship graph, the first view representing the first set of objects as a first set of nodes in a current hierarchy and relationships between the objects in the first set of objects as links between the nodes in the first set of nodes;

based on a user input to zoom to an area of zoom in the object map:

determine a subset of nodes from the first set of nodes corresponding to the area of zoom;

load, from the server, a second set of metadata for each node in the subset of nodes, the second set of metadata including content management metadata for each node in the subset of nodes; and re-render the subset of nodes in the area of zoom with the nodes in the subset of nodes updated to reflect the second set of metadata;

based on a user input to select a second region of interest at a new position:

determine a second set of objects in the repository is associated with the second region of interest at the new position;

retrieve through the application program interface, metadata stored in the repository for the second set of objects in the repository, wherein the amount of metadata retrieved from the repository for a given object of the second set of objects is based on a level of zoom from a plurality of levels of zoom;

display in the graphical user interface a modified view, the modified view including a second set of nodes representing the second set of objects in the repository and links representing the relationships stored in the repository between the objects within the second set of objects as part of a continuous object map with the first set of nodes;

based on detecting user interaction with a first selected node in the object map, display in visual association with the first selected node, available actions performable on a corresponding object within the repository represented by the first selected node;

based on detecting a further user interaction with first selected node in the object map, generate a request to perform a user selected action on the corresponding object represented by the first selected node;

determine a future state the objects of the first set of objects for a selected future time period based on one or more events scheduled for the first set of objects in the future;

determine a future hierarchy of the objects in the first set of objects based on the future state of the objects in the first set of objects;

display the current hierarchy and the future hierarchy on a scrollable timeline in the graphical user interface based on the selected future time period in the graphical user interface, where the display includes nodes representing the first set of objects and links representing the relationships between the first set of objects when the one or more scheduled events occur; and based on user interaction with the graphical user interface, display in the graphical user interface in connection with an object of the first set of objects or second set of objects, one or more fields of metadata associated with that object, the one or more fields of metadata including one or more of: a workflow status of the object, a publication status of the object, an approval status of the object, a sequence of related projects to the object, scheduling information regarding the object, or a due date for events associated with the object.

15. The non-transitory computer readable medium of claim 14, wherein the user selected action comprises modifying the metadata of the corresponding object represented by the first selected node.

16. The non-transitory computer readable medium of claim 15, wherein modifying the metadata of the corresponding object represented by the first selected node changes the relationship between at least two objects in the first set of objects.

17. The non-transitory computer readable medium of claim 14, further comprising code executable to display, in the graphical user interface, more or less metadata for each of the first set of nodes based on a level of zoom for the first view, wherein as the level of zoom for the first view increases an amount of the displayed metadata increases and as the level of zoom for the first view decreases the amount of the displayed metadata decreases.

18. The non-transitory computer readable medium of claim 14, wherein the computer readable program code is executable to speculative precache metadata, wherein speculative precaching metadata comprises:

determining an extended region of interest based upon the first region of interest, wherein the extended region of interest comprises one or more objects surrounding the first region of interest but not residing in the first region of interest; and loading metadata for objects within the extended region of interest without immediately displaying objects in extended region of interest that are not also within the first region of interest.

* * * * *